(12) United States Patent
Christensen, Sr. et al.

(10) Patent No.: US 11,524,634 B1
(45) Date of Patent: Dec. 13, 2022

(54) SWITCH MOUNT HOUSING FOR A UTILITY TASK VEHICLE

(71) Applicants: Michael Christensen, Sr., Ramona, CA (US); Kyle Christensen, Ramona, CA (US)

(72) Inventors: Michael Christensen, Sr., Ramona, CA (US); Kyle Christensen, Ramona, CA (US)

(*) Notice: Subject to any disclaimer, the term of this patent is extended or adjusted under 35 U.S.C. 154(b) by 0 days.

(21) Appl. No.: 17/691,779

(22) Filed: Mar. 10, 2022

(51) Int. Cl.
  *B60R 11/00* (2006.01)
  *B60R 11/04* (2006.01)

(52) U.S. Cl.
  CPC .............. *B60R 11/00* (2013.01); *B60R 11/04* (2013.01); *B60R 2011/0005* (2013.01); *B60R 2011/0052* (2013.01); *B60R 2011/0075* (2013.01)

(58) Field of Classification Search
  CPC .. B60R 11/00; B60R 11/04; B60R 2011/0005
  USPC ............................................. 296/1.07, 37.12
  See application file for complete search history.

(56) References Cited

U.S. PATENT DOCUMENTS

| | | | |
|---|---|---|---|
| 7,488,099 B2* | 2/2009 | Fogg .................... | B60Q 1/2665 362/464 |
| 7,950,486 B2* | 5/2011 | Van Bronkhorst .. | B60G 17/021 180/89.11 |
| 9,731,782 B2* | 8/2017 | Kondrat ................. | B62J 50/225 |
| 9,776,481 B2* | 10/2017 | Deckard ................ | B60J 5/0487 |
| 2021/0001780 A1* | 1/2021 | Hancock ................ | B60R 11/00 |

* cited by examiner

*Primary Examiner* — Pinel E Romain
(74) *Attorney, Agent, or Firm* — Cynthia S. Lamon; Lamon Patent Services

(57) ABSTRACT

A housing assembly for mounting at least one electric component in a vehicle is provided as a three-dimensional form having an internal volume, a general material wall thickness, a top wall, a side wall, and a front wall surface presenting the at least one mounted electrical component to an operator in the vehicle, the form mountable at one side to a first installation point on a substantially vertical utility task vehicle (UTV) dashboard cover surface through an opening in the top wall and, and an elongated bracket fixed at one end to the inside wall of the side wall of the three-dimensional form, and at a second bracket end extending out from the side wall and below the three dimensional form mounted to a second installation point on the UTV dashboard.

20 Claims, 8 Drawing Sheets

SWITCH MOUNT HOUSING FOR A UTILITY TASK VEHICLE

CROSS-REFERENCE TO RELATED DOCUMENTS

[NA]

BACKGROUND OF THE INVENTION

1. Field of the Invention

The present invention is in the field of switch wiring accessories pertaining to utility task vehicles (UTVs), particularly to apparatus for positioning additional electrical switches or repositioning existing electrical switches and other accessory control apparatus for operating features in a UTV.

2. Discussion of the State of the Art

In the art of off-road vehicles (ORVs), recreational vehicles such as all-terrain vehicles (ATVs) and utility task vehicles (UTVs) are available for off road recreation and or task performance. The main difference between an ATV and a UTV is that an ATV is designed for one person to ride while a UTV typically seats two or up to six persons including the driver of the vehicle.

UTVs are standardized by the American National Standards Institute (ANSI), which sets standards for multipurpose off-highway utility vehicles (MOHUVs), which include UTVs, also referred to as side-by-sides (SxS) in the art. UTVs under ANSI standards typically are used to transport cargo and passengers, have non-straddle seats, travel on four or more wheels, are steered with a steering wheel and are driven and braked using pedals, have gasoline engines, and have top speeds from 25 miles-per-hour (mph) to over 30 mph dependent on intended purpose of the UTV. UTVs or side-by-sides typically have an original equipment manufacturer (OEM) roll cage or roll-over-protective cover. UTVs may also have hard tops, windshields, and cab enclosures.

Manufacturers of UTVs include but are not limited to notable companies like Bombardier Recreational Products, Inc., Kawasaki, Honda, Polaris, Suzuki, Yamaha, John Deer, Caterpillar, Inc., and many others. UTVs come with stock switch panels that may include on/off rocker type switches, push button switches, or other types of hardware for controlling the stock features of the UTV such as lights, signals, horns, wipers, etc. Many owners of UTVs customize them by adding new features in accordance with how the UTVs will be used. Such modifications may involve adding aftermarket switch panels to the UTV dashboard for grouping control switches in a convenient place that the driver of the UTV can reach.

UTV operation may be largely off road over uneven terrain making manual switching somewhat difficult when the UTV is in motion because of bumpiness and sudden shifts as the UTV is being navigated. For example, a switch may be accidentally powered on or off or the wrong switch may be activated by accident. A UTV operator may stop the UTV to activate switches; however, this may be inconvenient for the UTV owner depending on what features the stitches are controlling and whether the switches must be toggled while the UTV is in full motion. Problems with adding switches may include limited space on the UTV dash area that already includes the basic stock switch panel footprint(s), which are typically flat and rectangular.

Therefore, what is clearly needed is a switch mount housing for a UTV that reduces or eliminates the problems described above with UTV customization where switches are added to the UTV and/or relocated on the UTV.

BRIEF SUMMARY OF THE INVENTION

According to one embodiment, a housing assembly for mounting at least one electric component in a vehicle is provided comprising a three-dimensional form having an internal volume, a general material wall thickness, a top wall, a side wall, and a front wall surface presenting the at least one mounted electrical component to an operator in the vehicle, the form mountable at one side to a first installation point on a substantially vertical utility task vehicle (UTV) dashboard cover surface through an opening in the top wall and; and an elongated bracket fixed at a first bracket end having a first bracket opening there through, to the inside wall of the side wall of the three-dimensional form, and a second bracket end with a second bracket opening there through, the second bracket end extending out from the side wall and below the three dimensional form and mounted to a second installation point on the UTV dashboard.

In a preferred embodiment, the three-dimensional form is a triangular wedge form fitting to a corner area of the UTV dashboard cover. In one embodiment, the three-dimensional form is injection molded from ABS plastic. In one embodiment, the second installation point is a frame member or post. In one embodiment, the three-dimensional form has a material relief feature on the lower edge of the side wall where the second bracket end extends from the side wall. In a preferred embodiment, the front wall surface is substantially vertical in installation orientation.

In one embodiment, the housing assembly of claim 1 further includes at least two elongate fins materially contiguous with the three-dimensional form, the fins spaced apart and parallel to one another and disposed vertically on and extending orthogonally from the surface plane of the front wall. In this embodiment, the fins function to divide multiple mounted electrical components on the surface of the front wall into vertical columns. In one embodiment, the electric components mounted are switches. In another embodiment, the electric component mounted is an interface to an electric accessory device. In one embodiment, the electric components mounted are a mixture of charging ports, switches, and electrical outlets. In one embodiment, the electrical component mounted is a camera.

In a preferred embodiment, the housing assembly is installed in the left corner area of a UTV dashboard cover as viewed from the perspective of a UTV operator. In another embodiment, the housing assembly is installed in the right corner area of a UTV dashboard cover as viewed from the perspective of a UTV passenger. In one embodiment, the housing assembly is installed on top of another housing that is materially contiguous with the UTV dashboard cover. In one embodiment, the housing assembly is installed on top of another housing that shares the second installation point.

In one embodiment, the electrical component mounted is a switch panel containing multiple switch bays. In a preferred embodiment, the elongated bracket is injection molded from ABS plastic. In a variation of this embodiment, the first end of the elongated bracket is heat welded to the inside surface of the side wall of the three-dimensional form. In another variation of the embodiment, the first end of the elongated bracket is bolted to the inside surface of the side wall or the three-dimensional form.

DETAILED DESCRIPTION OF THE INVENTION

In various embodiments described in enabling detail herein, the inventor provides a unique switch mount housing for locating new custom utility and feature switch interfaces and or relocating existing switch interfaces in a Utility Task Vehicle (UTV). A goal of the present invention is to locate utility and switch interfaces in convenient proximity for the vehicle operator. A further goal of the present invention is to create additional custom switch interface footprints in a UTV. Another goal of the invention is to utilize additional space in a UTV front dash architecture to add or relocate switch facilities in a manner that does not clutter original equipment manufacturer (OEM) default switch interface footprints. The present invention is described using the following examples, which may describe more than one relevant embodiment falling within the scope of the invention.

Figure 1:
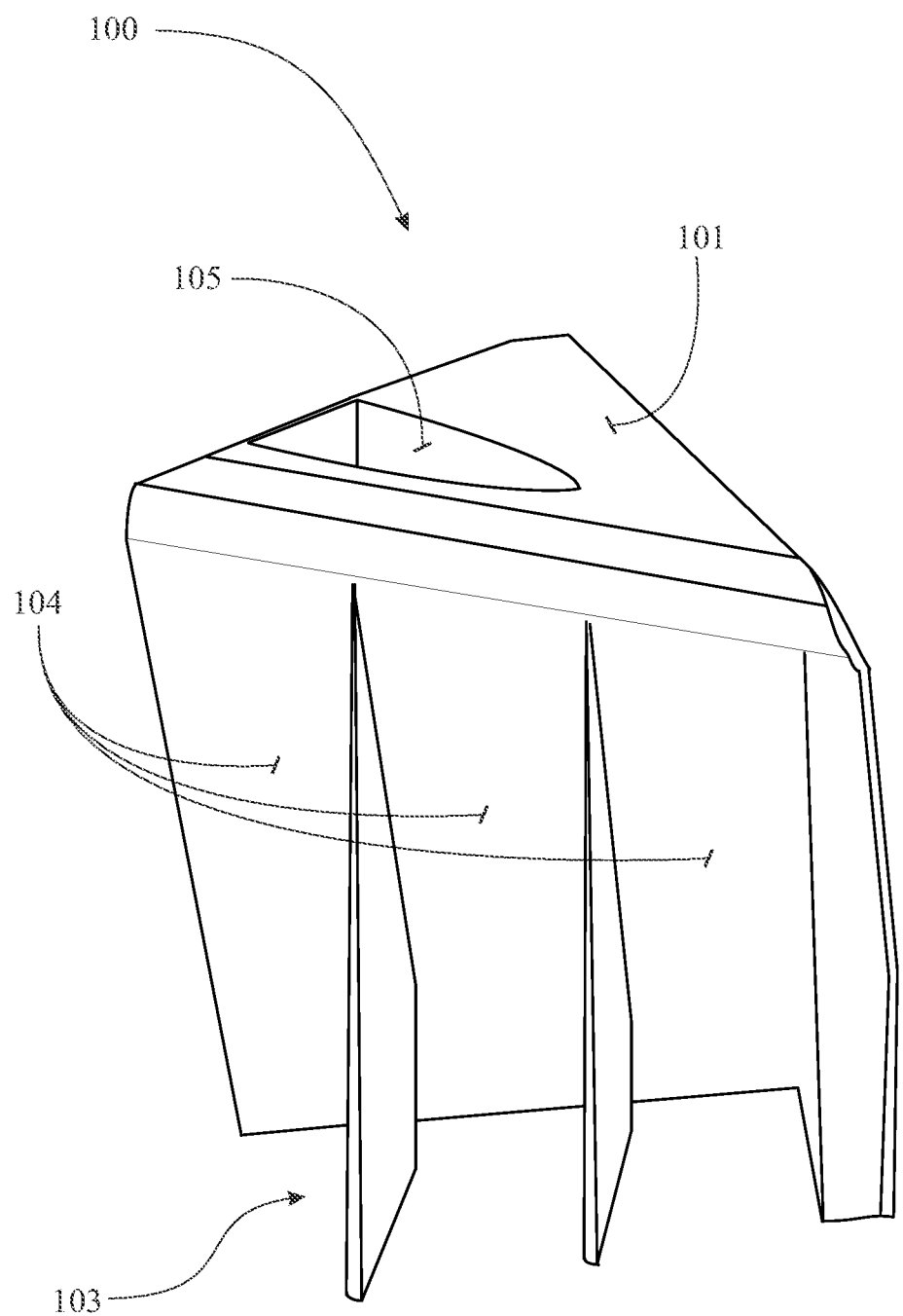
FIG. 1 is a perspective view of a switch mount housing according to an embodiment of the present invention.

FIG. 1 is a perspective view of a switch mount housing 100 according to an embodiment of the present invention. Switch mount housing 100 may be a partially open housing manufactured from acrylonitrile butadiene styrene (ABS) thermoplastic material 101 commonly used for the injection molding of switch housing components used in automobiles and many other applications. Other materials may be implemented in manufacturing housing 100 including any one or more of Aluminum, steel, titanium or other metals, carbon-fiber-reinforced polymers, and polypropylene and polyethylene plastics.

In this perspective view, the open portion of housing 100 is not visible but may be assumed present at the left rear panel of housing 100 that abuts against a UTV dashboard cover that may be modified by providing an opening there through for routing a switch wiring harness through the stock UTV dash.

Switch mount housing 100 has a purposely designed wedge-shaped triangular form that is largely hollow and may include form indents such as form indent 105 for mounting to the surface of the UTV dash material. The triangular form enables angular installation points to the UTV dash cover that enable convenient presentation of added switches to the UTV operator without cluttering the space of existing OEM switch plate or switch mount dash footprints which are presented in raised geometric rectangular or annular forms on the front of the dash cover.

In one embodiment, switch mount housing 100 has a substantially uniform wall thickness in non-machined areas of the form, however, switch mount housing 100 may include variances in material thicknesses without departing from the spirit and scope of the present invention. In a preferred embodiment, a specially formed ABS bracket (not visible) is provided that may be installed to the inside wall of the housing form allowing housing form 100 to be installed by screw or bolt securely to the sidewall of the UTV dash cover at one upper side that is partially open to receive the wiring harness and at the opposite lower side to a horizontal frame member or common installation point. Detailed description of the housing bracket is described later in this specification.

In this embodiment, switches or switch interfacing components may be custom installed through the material of surface 104 of housing form 100. In a typical installation, switch mount housing surface 104 is angled to face the UTV operator on the left side of the operator utilizing corner space of the UTV dash cover. In this embodiment, switch mount housing 100 includes vertically aligned divider fins 103 that may be provided to physically isolate installed switches from one another on surface 104 so that a UTV operator may rely on both visual and physical touch queues to ensure the correct switches are operated while the operator is driving the UTV, for example, over uneven terrain, when the driver needs to keep eyes on the road and only using touch to operate controls, such as switches.

In one embodiment, fins 103 may align with divider fins on another housing that may exist in the UTV such as an OEM dynamic power steering (DPS) mode controller, typically found to the left side of the UTV operator on a lower portion of the UTV dash cover below the steering wheel. In this manner, touch only operation remains consistent between dash of the vehicle and housing 100. In this example, switch mount housing 100 is an unmodified form showing blank unmachined surfaces. A user may remove material from surface 104 between fins 103 for the purpose of adding rocker type switches, electrical interfaces, or charging ports of various and sundry types to the housing; the switches or electrical interfaces are connected to the appropriate wires in the wiring harness enclosed within the hollow form of the housing. Switch mount housing 100 enables the UTV operator to add new features to the UTV and or to relocate existing switches or electrical interfaces including ports (outlets, USB) from other parts of the UTV dashboard to a convenient location just to the left of the UTV operator. Other embodiments allow for cutouts or punchouts in appropriate positions between the fins 103.

Figure 2:
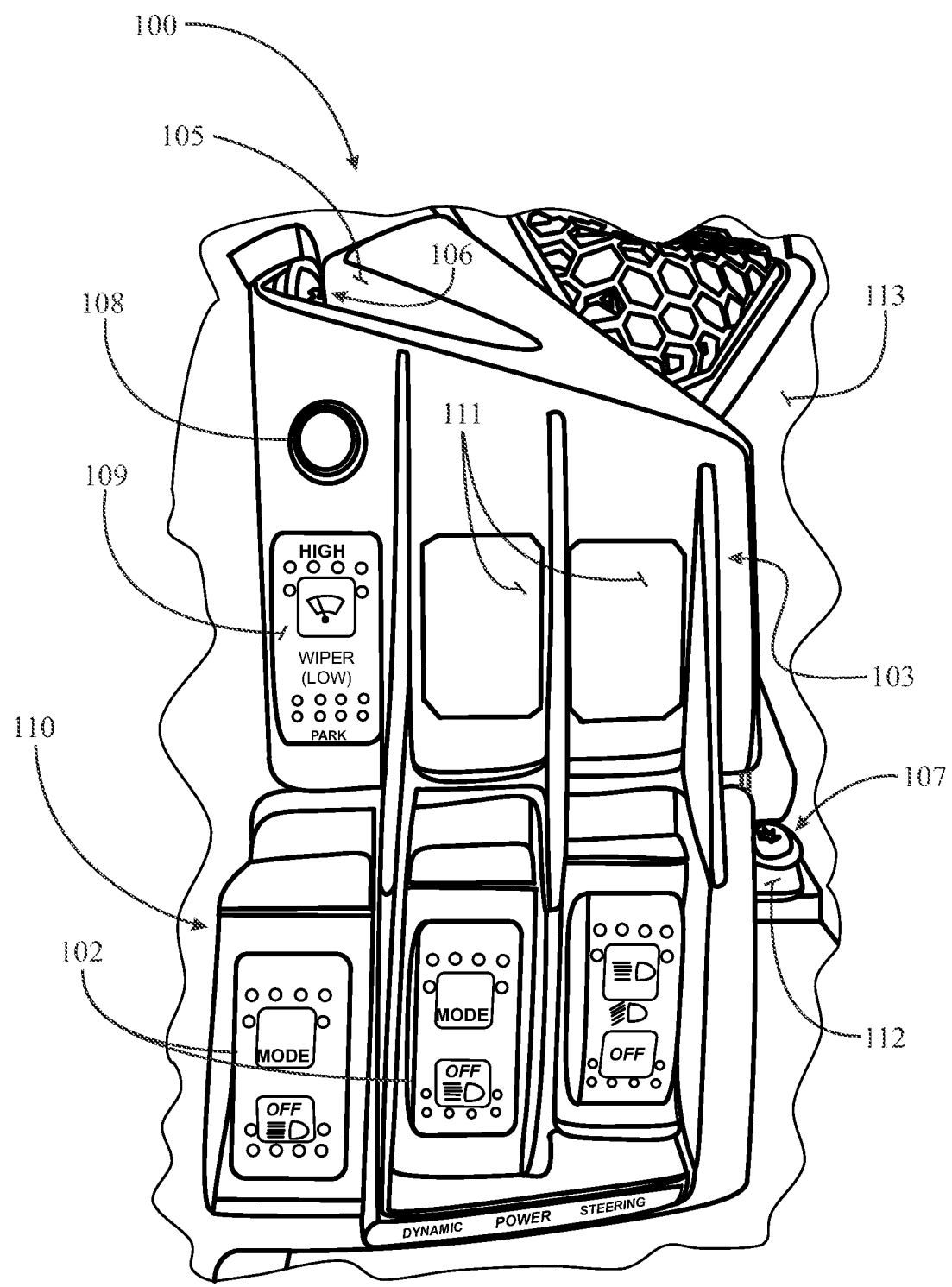
FIG. 2 is a partial view of the switch mount housing of FIG. 1 installed in a UTV.

FIG. 2 is a partial view of switch mount housing 100 of FIG. 1 installed in a UTV. In this view, switch mount housing 100 is installed on top of an existing DPS switch mount housing 110 in a stacked formation vertically along the left corner of the UTV dashboard 113. The existing switch mount housing 110 is an OEM contiguous part of UTV dashboard 113 and houses control/mode switches 102 for a dynamic power steering (DPS) feature as well as switches for lighting features. In this embodiment, divider fins 103 on switch mount housing 100 align with like fins on the interfacing surface of the DPS housing 110. Physical isolation of the switches, in this case vertical columns, enables the operator of the UTV to physically feel where the switches are and reduces the potential of manipulating the wrong switches when driving the vehicle.

In this embodiment, a first installation interface 106 is provided to the sidewall of UTV dashboard 113 by threading a mounting screw through the backwall of recessed form 105 into a threaded mounting plate or collar installed in an opening in the sidewall of the UTV dashboard. In this embodiment, a second installation interface 107 is provided to a horizontal frame member or dashboard common installation point 107. The upper end of bracket 112 is mounted or otherwise fixed to the inside wall of switch mount housing 100 and mounted at the other end with a mounting screw and washer to a horizontal frame member at installation point 107. Bracket 112 may be molded from ABS material or otherwise fabricated of another rigid but form bendable material like sheet metal. In a preferred embodiment, bracket 112 is molded from the same ABS plastic used for housing 100. Plastic material in the form of bracket 112 helps to reduce the potential of electrical short stemming from contact with a bare wire and a metallic bracket connected to a metallic frame member. Another embodiment provides the bracket piece be molded as an integral extension from the housing in one solid piece. The bracket extension installed in a same manner to the existing dash location.

Switch mount housing 100 includes a rocker switch 109 for operating windshield wipers. In this embodiment, switch positions 111 and annular opening 108 represent switch mount openings through the wall of the housing 100 that are covered or plugged because no switches are currently installed; however, any custom application for adding switches or electrical interfaces including device charging ports and outlets for powering accessory devices may be observed as far as arranging access locations on the surface of the housing without departing from the spirit and scope of the present invention. In one embodiment, switch housing 100 and DPS switch housing 110 are stacked forms with only housing 100 including a wedge-triangular form enabling installation on an existing dash that may be curved or slanted.

Switch mount housing 100 includes a kill switch for quickly shutting off a feature of the UTV for emergency purposes, for example killing the engine. In this partial view, the entire UTV dashboard corner is not visible. In general switch mount housing 100 may be installed on the left side in the corner area of a UTV dashboard cover under the left rollbar upright taking up space to the left of the steering wheel and speedometer display. The triangular wedge form of housing 100 serves to present added or relocated switches or electrical interfaces on a plane facing the UTV operator and closer to the UTV operator than the typical flat panel switches. The wedge shape also enables proper alignment with existing switches, below, as seen in FIG. 2.

Figure 3A:
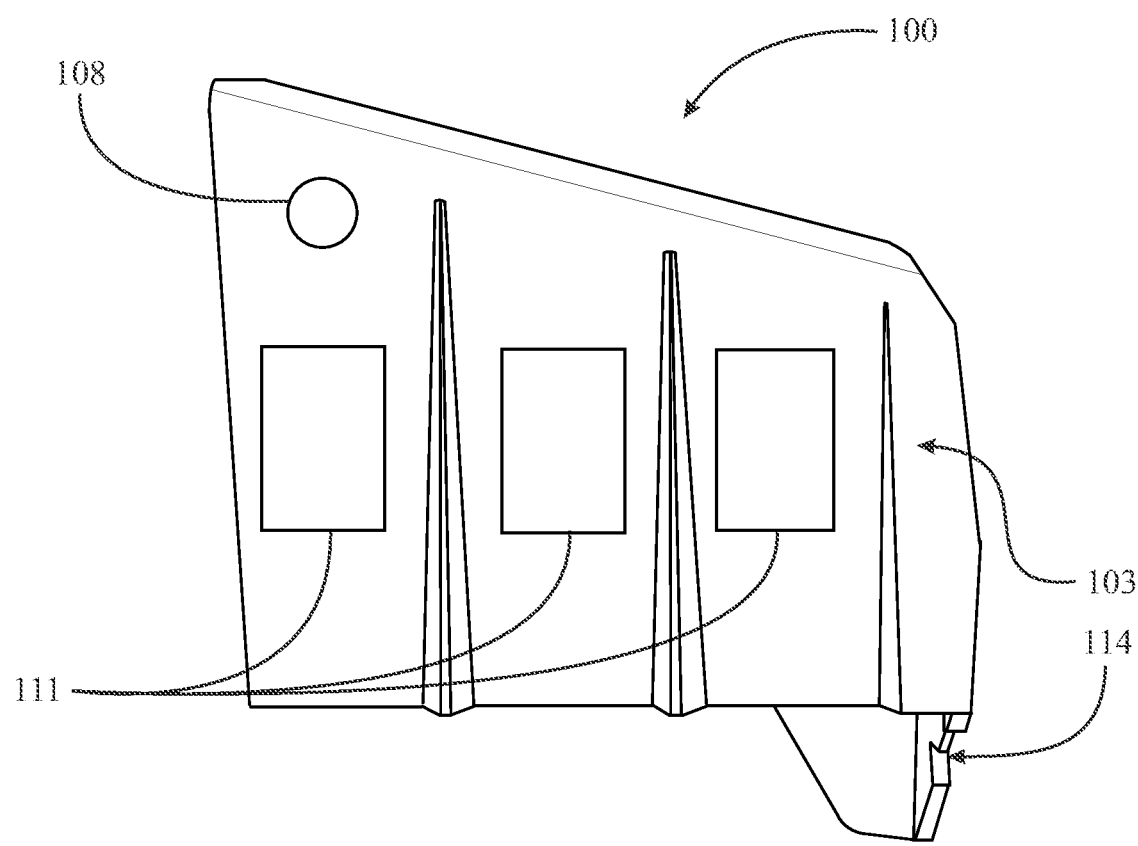
FIG. 3A is a frontal view of the switch mount housing of FIG. 1.
Figure 3B:
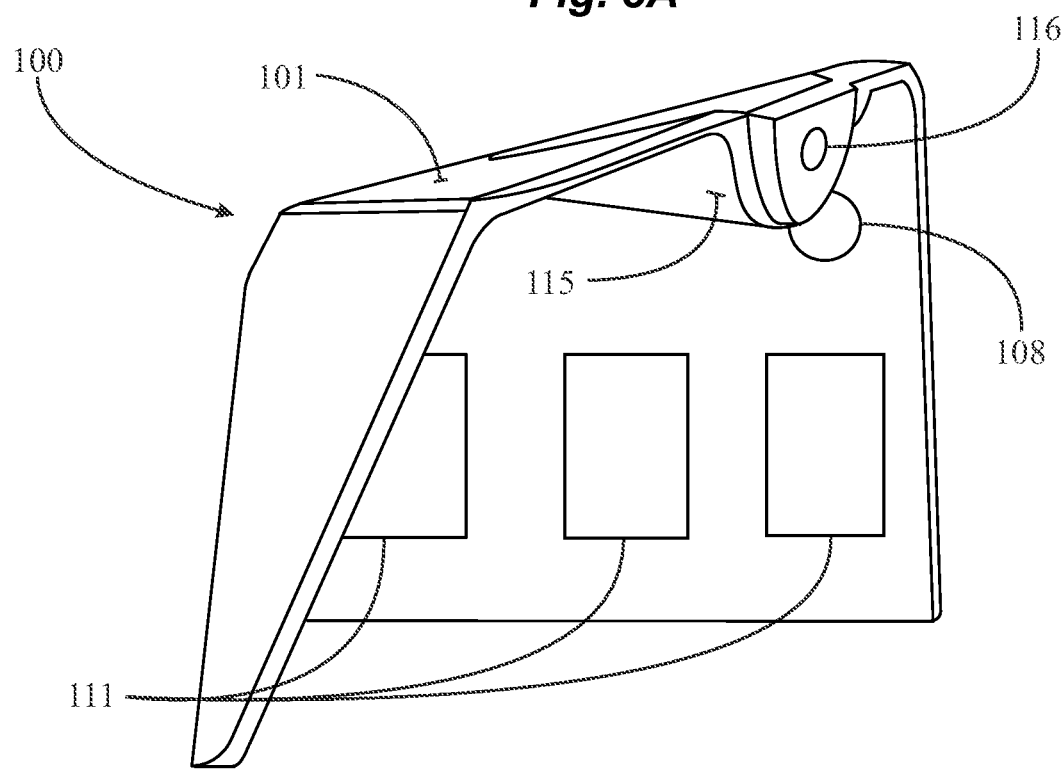
FIG. 3B is a rear view of the switch mount housing of FIG. 1.

FIG. 3A is a frontal view of switch mount housing 100 of FIG. 1. FIG. 3B is a rear view of switch mount housing 100 of FIG. 1. Referring now to FIG. 3A, switch mount housing 100 includes logical openings for locating switches namely annular opening 108 and one each fin-isolated rectangular openings 111 facilitating rocker type switches. Fins 103 provide physical isolation between the switch openings 111. A machined rectangular relief feature 114 is disposed on the lower right sidewall of housing 100 and provides the relief for bracket 112 described above in FIG. 2. A small opening 117 is provided above rectangular bracket material relief feature 114 and might be used for screw or bolt relief to attach bracket 112 against the inside wall surface of switch mount housing 100. In one embodiment, the upper end of housing bracket 112 is heat welded to the inside wall of the switch mount housing form.

Referring now to FIG. 3B, the open side rear portion of switch mount 100 is depicted. Openings 111 and 108 are visible on the front wall. Recessed form 105 produces conical form 115 for structural integrity in mounting to the dashboard of the UTV. Opening 116 is provided through the back wall of the recessed form to accept the mounting screw that fits through the back wall of the form. The edges and corners of switch mount housing 100 may be rounded and/or smoothed to reduce sharp edges.

Figure 3C:
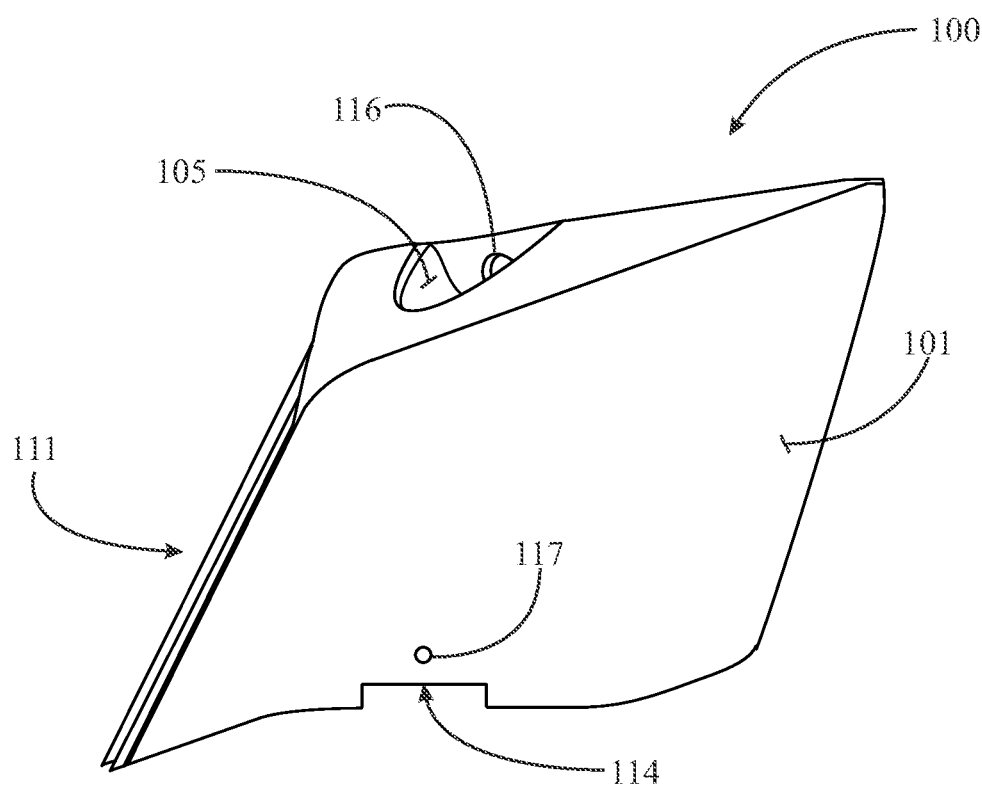
FIG. 3C is a right-side view of the switch mount housing of FIG. 1.
Figure 3D:
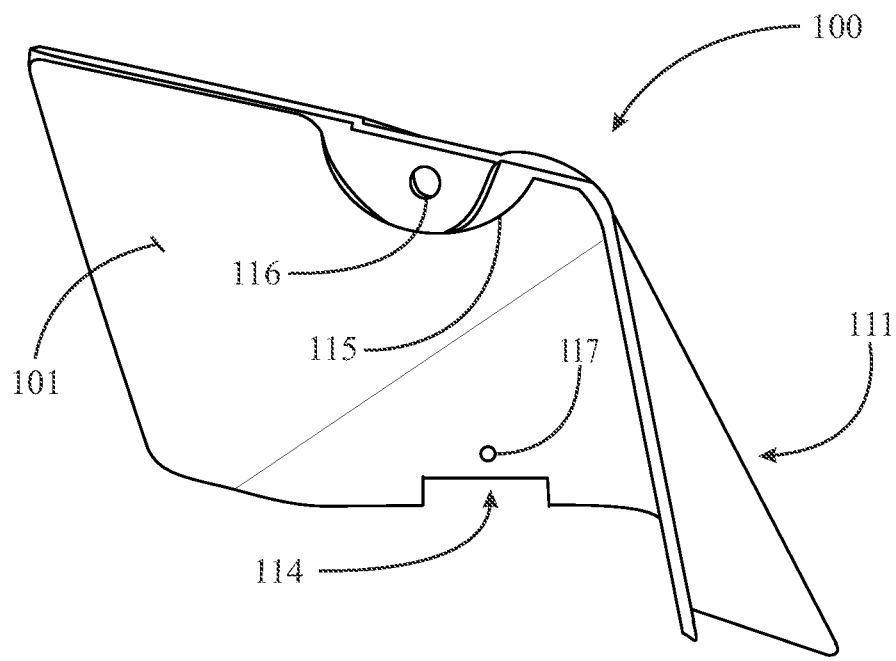
FIG. 3D is a left-side view of the switch mount housing of FIG. 1.

FIG. 3C is a right-side view of switch mount housing 100 of FIG. 1. FIG. 3D is a left-side view of switch mount housing 100 of FIG. 1. Referring now to FIG. 3C, switch mount housing 100 is also a slanted form to compensate for the angle of the dashboard surface of the UTV where the housing is mounted to maintain a substantially level presentation of the forward-facing switches or electrical interfaces. Material 101 may be a petroleum based thermal plastic having a higher melting point than most other polymers and is harder than most plastics. Fins 103 on the front surface are viewed from the right side of the housing in this view.

Referring now to FIG. 3D, switch mount housing 100 is viewed from the left side depicting the interior portion of the housing. As previously described, opening 117 is provided above rectangular bracket relief feature 114 to attach bracket 112 at that end to the inside surface of housing 100. The open end of switch mount housing 100 is secured to the UTV sidewall by bolt or screw through opening 116. Fins 103 on the front surface are viewed from the left side of the housing in this view.

Figure 4B:
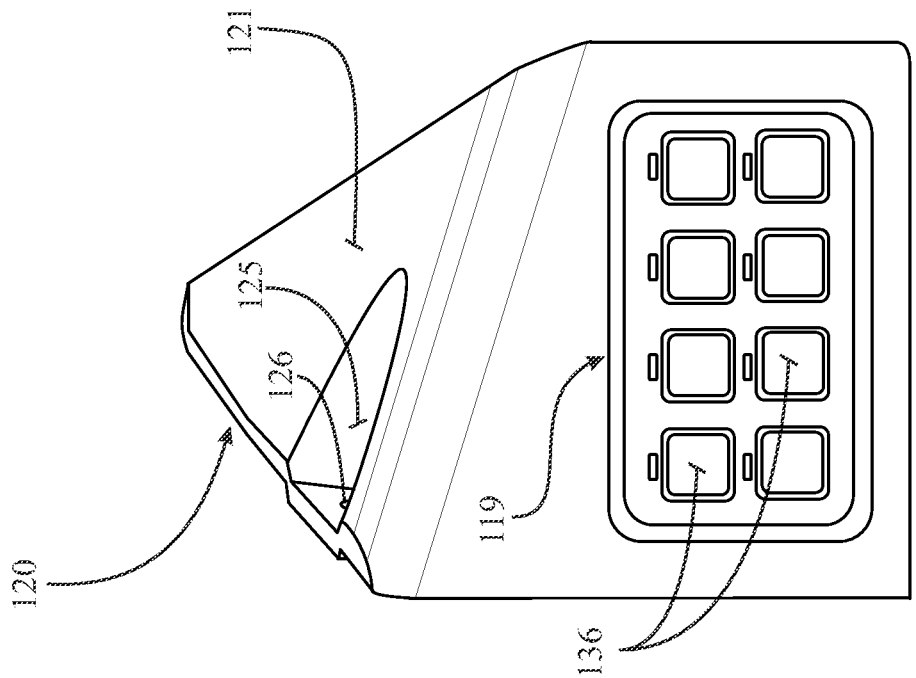
FIG. 4B is a front perspective view of the switch mount housing of FIG. 4A depiction an alternate switch interface pattern.
Figure 4A:
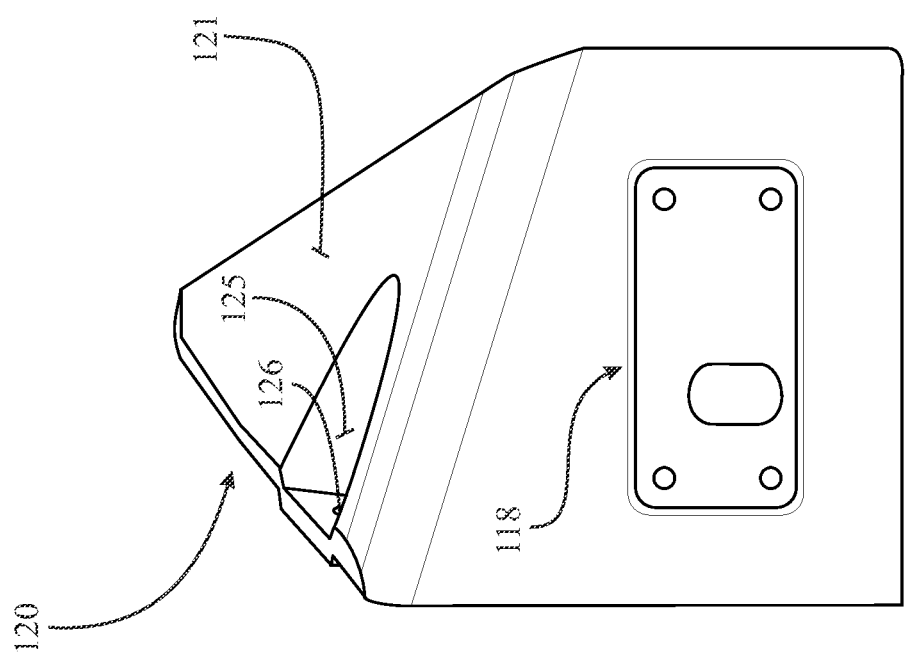
FIG. 4A is a front perspective view of a switch mount housing according to an alternative embodiment of the invention.

FIG. 4A is a front perspective view of a switch mount housing 120 according to an alternative embodiment of the invention. FIG. 4B is a front perspective view of the switch mount housing of FIG. 4A depicting an alternate switch interface pattern. Referring now to FIG. 4A, switch mount housing 120 may be designed in the same basic triangular wedge form as switch mount housing 100 where, in this design, there is no dividing fin architecture. Element 121 refers to the material ABS plastic and is analogous to element 101 of FIG. 1. Recessed form 125 is analogous to recessed form 105 described above in the description of switch mount housing 100 of FIG. 1. Opening 126 is analogous to opening 116 of switch mount housing 100 depicted in FIG. 3B.

In this embodiment, the quadrilateral front surface formerly supporting fins in the embodiment of FIG. 1 supports an electrical device mounting interface 118. Mounting interface 118 may be formed as a rectangular indentation with a pattern of openings for accepting the interfaced device. For example, the interfaced device may be a camera or a keyboard or some other electric device that may or may not require wiring, for example, a battery powered device with an onboard source. In one embodiment, interface 118 may be a device charging interface.

Referring now to FIG. 4B, an alternative interface 119 is depicted in place of interface 118. Alternate interface 119 may be a rectangular switch panel glued into the rectangular recessed form. Interface 119 takes up more of a footprint than interface 118 requiring a larger recessed form to house the switch panel. In this embodiment, the switch panel (119) supports eight bays 136 where individual switches, outlets, and ports may be installed. In a preferred embodiment, switch housings 100 and 121 are similar enough in form to enable bracket 112 to be used to install either one to the UTV dashboard.

Figure 5:
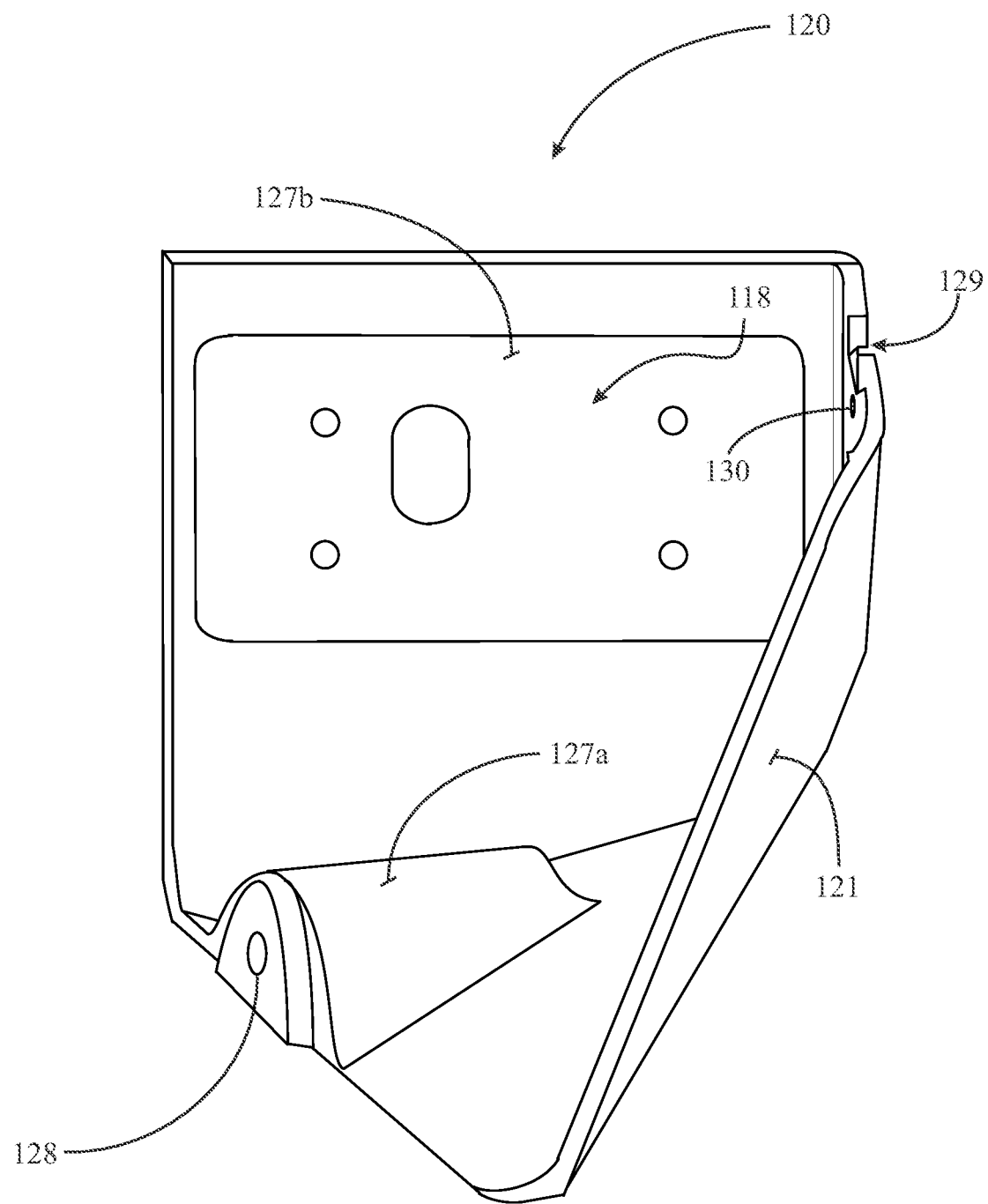
FIG. 5 is a rear perspective view of the switch mount housing of FIG. 4A.

FIG. 5 is a rear perspective view of switch mount housing 120 of FIG. 4A. Switch mount housing 120 includes a raised half conical structure 127a, which is analogous to structure 115 of FIG. 3B above relative to switch mount housing 100. Switch mount housing 120 includes a rectangular raised structure 127b resulting from the recessed rectangular form 118 for supporting an attached electrical device. Interface pattern 118 comprises openings extending through the wall thickness of the ABS material 121.

Switch mount housing 120 includes a material relief feature 129, which is analogous to material relief 114 on switch mount housing 100 of FIG. 3A. A bracket mount opening 130 above material relief feature 129 is analogous to opening 117 of switch mount housing 100 of FIG. 3A. Opening 128 is analogous to opening 116 on switch mount housing 100 of FIG. 3B. The rectangular recessed interface 119 depicted in FIG. 4A represents another of many variant switch mounting patterns of openings or device mounting patterns of openings that may be provided to the mounting surface on both the finned and patterned (no fins) switch mount forms described.

Figure 6A:
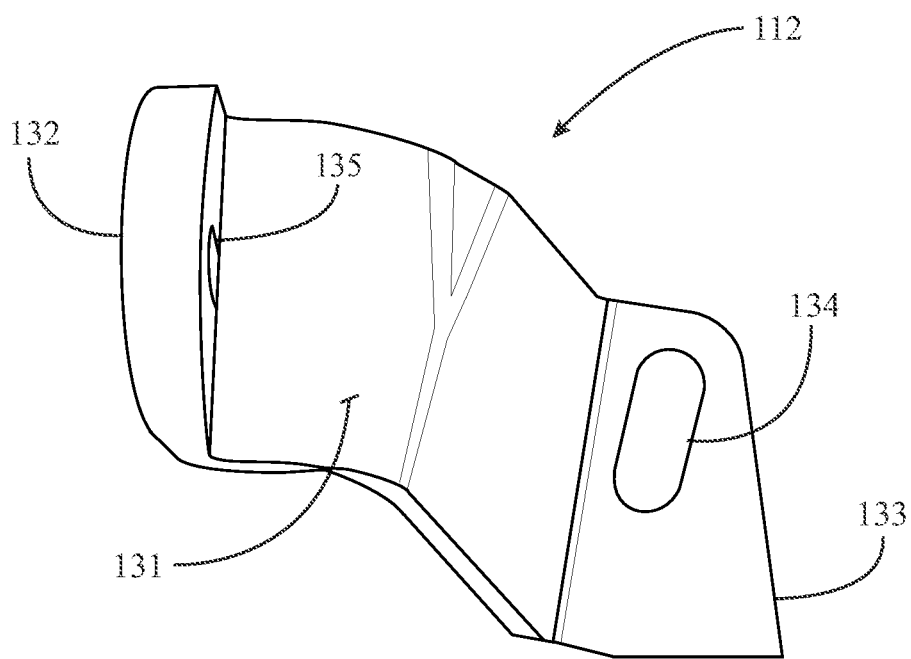
FIG. 6A is a top perspective of housing bracket of FIG. 2.
Figure 6B:
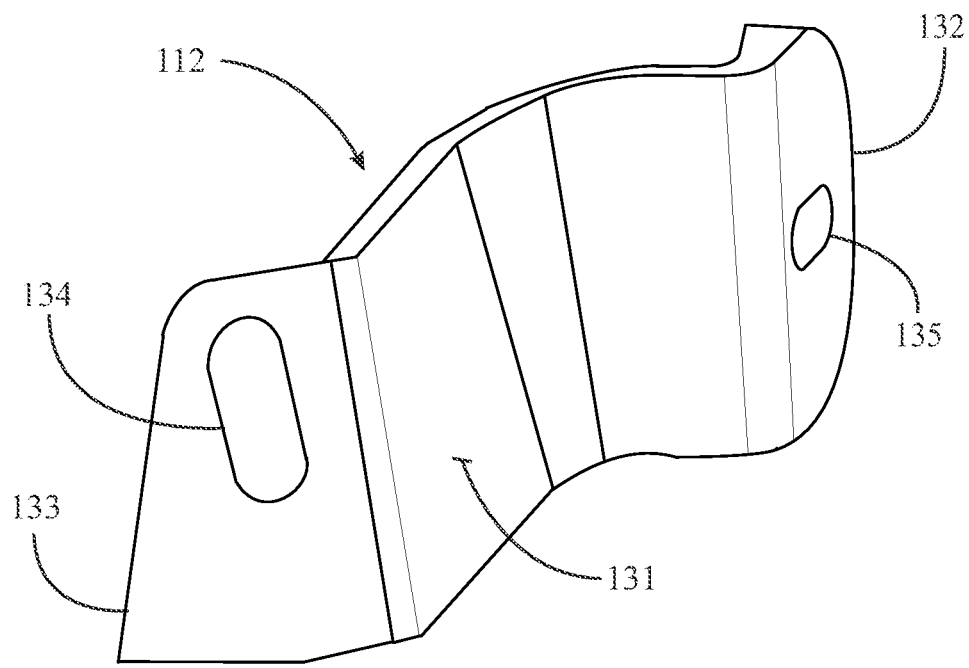
FIG. 6B is a bottom perspective view of the housing bracket of FIG. 2.

FIG. 6A is a top perspective of housing bracket 112 of FIG. 2. FIG. 6B is a bottom perspective view of the housing bracket of FIG. 2. Referring now to FIG. 6A, housing bracket 112 is an elongated bracket purposely designed and molded to a bent form that may be fixed to the inside wall of the switch mount enclosure to provide rigid mounting extension for securing the switch mount housing to the dash using different mounting planes, one substantially horizontal relating to the dash architecture and the other substantially vertical and conforming largely to the angle of the left side of the UTV dashboard surface.

Housing bracket 112 may be injection molded or thermally treated ABS plastic bent into form. Bracket 112 as a wall thickness that may be thicker at the bracket ends and may not necessarily be uniform. Bracket 112 includes a substantially vertical first end 132 having a slot opening 135 provided there through to accept a mounting screw and washer. Bracket end 132 is formed or bent to an angle that conforms with the switch mount housing vertical sidewall. Bracket 112 has a second bracket end 133 bent to an angle suitable for mounting to a largely horizontal frame component or common dash installation point to secure the housing down over the underlying OEM component. Second bracket end 133 has a slot 134 provided there through for accepting a mounting screw and washer securing that side of the housing down over another switch mount housing component in a vertical corner stack utilizing the dashboard corner space to the left of the operator.

Referring now to FIG. 6B, bracket 112 is viewed from underneath the installation. ABS material 131 may be injection molded into form to produce bracket 112. In one embodiment, bracket 112 may be molded to the inside of the sidewall of the switch mount housing in the same process. In another embodiment, bracket 112 may be molded separately from the housing and heat welded to position inside the housing. In another embodiment, bracket 112 may be attached to the housing by hardware.

Figure 7:
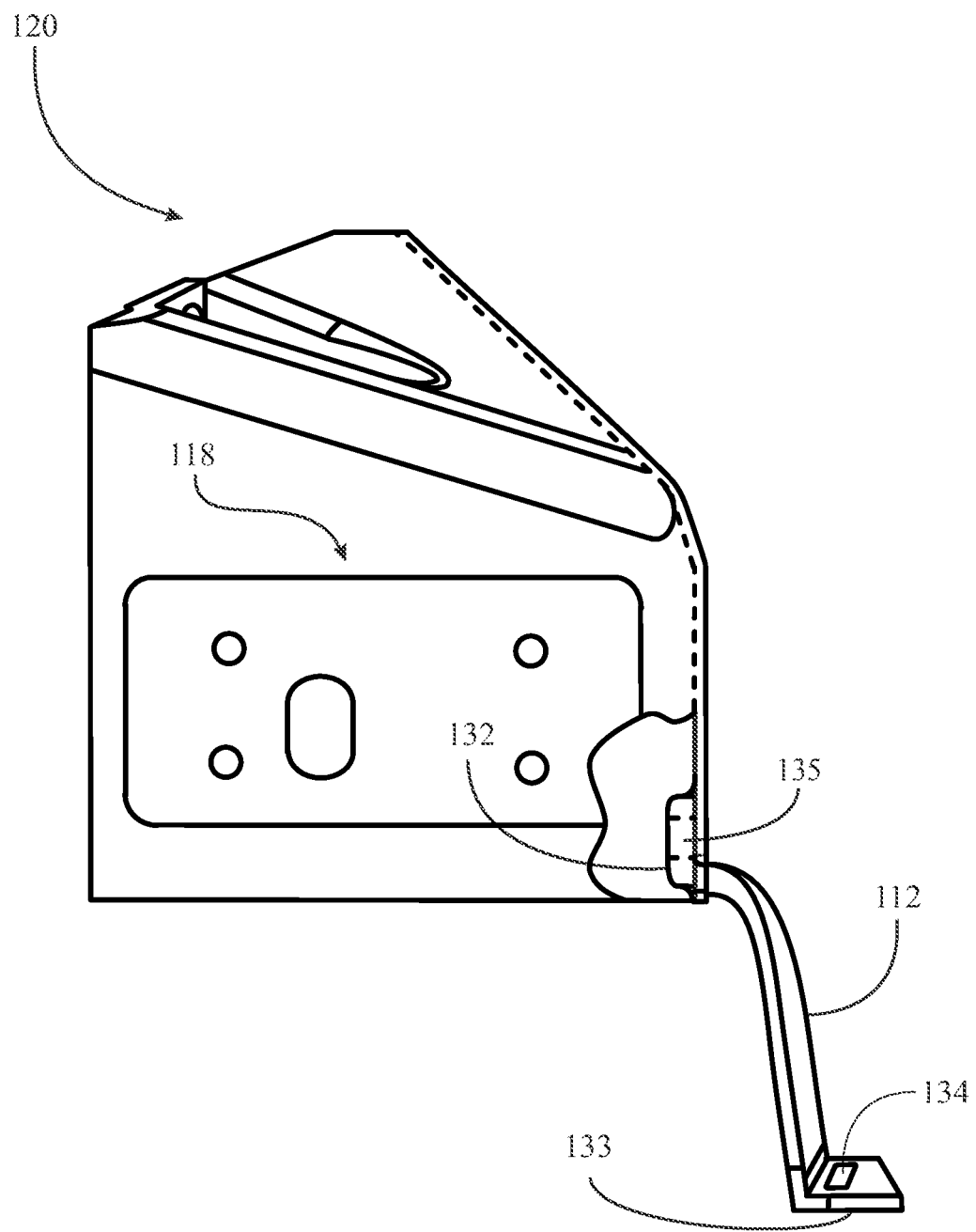
FIG. 7 is a front elevation view of the switch mount housing of FIG. 4A with corner material removed to show the housing bracket of FIG. 6A fixed to the housing according to one embodiment.

FIG. 7 is a front elevation view of switch mount housing 120 of FIG. 4A with corner material removed to show housing bracket 112 of FIG. 6A fixed to the housing form according to one embodiment. In this embodiment, a portion of material is removed for clarity from the lower right corner of the switch mounting surface including part of electric device interface 118. Bracket end 132 is bent upward to conform with the vertical sidewall of switch mount housing 120. In this example, bracket 112 is welded or otherwise heat formed or molded to the inside surface of the sidewall of housing 112. Hardware inserted through opening 135 may also be used and may be assumed present in some embodiments. Bracket 112 extends significantly below the bottom of housing 120 and egresses housing 120 through the material relief (114) described further above relative to FIG. 3A for example. Bracket 112 then bends downward and twists slightly to culminate at bracket end 133 with mounting opening 134 placed there through. Bracket end 133 is bent to a substantially horizontal plane for mounting to a horizontal installation point such as installation point 107 described in FIG. 2 above.

The switch mount housing 100 may be manufactured from processes including at least injection molding, cutting, welding and grinding material. Additionally, a heat stamp process, 3D printing, sheet lamination, may be implemented. Other manufacturing processes may be utilized without departing from the spirit and scope of the present invention.

The switch mount housing 100 of the present invention is not limited to being installed on the left side corner of the UTV dashboard. In one embodiment, a mirror imaged housing may be provided for installation on the right side of the UTV dash space, or multiple switch mount housings may be installed wherein the unit and/or units are customized for a UTV passenger to operate. Additionally, switch mount housing may be manufactured and sold alone, integrated with or without the bracket. In another embodiment, the switch mount housing 100 may be integrated or contiguously formed in a third-party replacement dashboard accessory. In this embodiment, the entire dash panel would be replaced with a unique dashboard or panel implementing novel aspects of the switch mount housing 100.

It will be apparent to one with skill in the art that the switch mount housing of the present invention may be provided using some or all the elements described herein. The arrangement of elements and functionality thereof relative to the switch mount housing of the invention is described in different embodiments each of which is an implementation of the present invention. While the uses and methods are described in enabling detail herein, it is to be noted that many alterations could be made in the details of the construction and the arrangement of the elements without departing from the spirit and scope of this invention. The present invention is limited only by the breadth of the claims below.

The invention claimed is:

1. A housing assembly for mounting at least one electric component in a vehicle comprising:
   a three-dimensional form having an internal volume, a general material wall thickness, a top wall, a side wall, and a front wall surface presenting the at least one mounted electrical component to an operator in the vehicle, the form mountable at one side to a first installation point on a utility task vehicle (UTV) dashboard cover surface; and
   an elongated bracket fixed at a first bracket end having a first bracket opening there through, to an inside wall of the side wall of the three-dimensional form, and a second bracket end with a second bracket opening there through, the second bracket end extending out from the side wall and below the three-dimensional form and mounted to a second installation point on the UTV dashboard.

2. The housing assembly of claim 1, wherein the three-dimensional form is a triangular wedge form fitting to a corner area of the UTV dashboard cover.

3. The housing assembly of claim 1, wherein the three-dimensional form is injection molded from ABS plastic.

4. The housing assembly of claim 1, wherein the second installation point is a frame member or post.

5. The housing assembly of claim 1, wherein the three-dimensional form has a material relief feature on a lower edge of the side wall where the second bracket end extends from the side wall.

6. The housing assembly of claim 1, wherein the front wall surface is substantially vertical in installation orientation.

7. The housing assembly of claim 1 further including at least two elongate fins materially contiguous with the three-dimensional form, the fins spaced apart and parallel to one another and disposed vertically on and extending orthogonally from a surface plane of the front wall.

8. The housing assembly of claim 7, wherein the fins function to divide multiple mounted electrical components on the front wall surface into vertical columns.

9. The housing assembly of claim 1, wherein the electric components mounted are switches.

10. The housing assembly of claim 1, wherein the electric component mounted is an interface to an electric accessory device.

11. The housing assembly of claim 1, wherein the electric components mounted are a mixture of charging ports, switches, and electrical outlets.

12. The housing assembly of claim 1, wherein the electrical component mounted is a camera.

13. The housing assembly of claim 1, installed in the left corner area of a UTV dashboard cover as viewed from the perspective of a UTV operator.

14. The housing assembly of claim 1, installed in the right corner area of a UTV dashboard cover as viewed from the perspective of a UTV passenger.

15. The housing assembly of claim 1, installed on top of another housing that is materially contiguous with the UTV dashboard cover.

16. The housing assembly of claim 7, installed on top of another housing that shares the second installation point.

17. The housing assembly of claim 1, wherein the electrical component mounted is a switch panel containing multiple switch bays.

18. The housing assembly of claim 1, wherein the elongated bracket is manufactured from a process including anyone of injection molded from ABS plastic, cutting, welding grinding, 3D printing and heat-stamp press.

19. The housing assembly of claim 1, wherein the first end of the elongated bracket is heat welded to the inside surface of the side wall of the three-dimensional form.

20. The housing assembly of claim 1, wherein the first end of the elongated bracket is bolted to the inside surface of the side wall or the three-dimensional form.

* * * * *